June 11, 1968     D. A. THIBODEAUX ET AL     3,387,745
SUGAR CANE PLANTING MACHINE
Filed Dec. 27, 1966     6 Sheets-Sheet 1
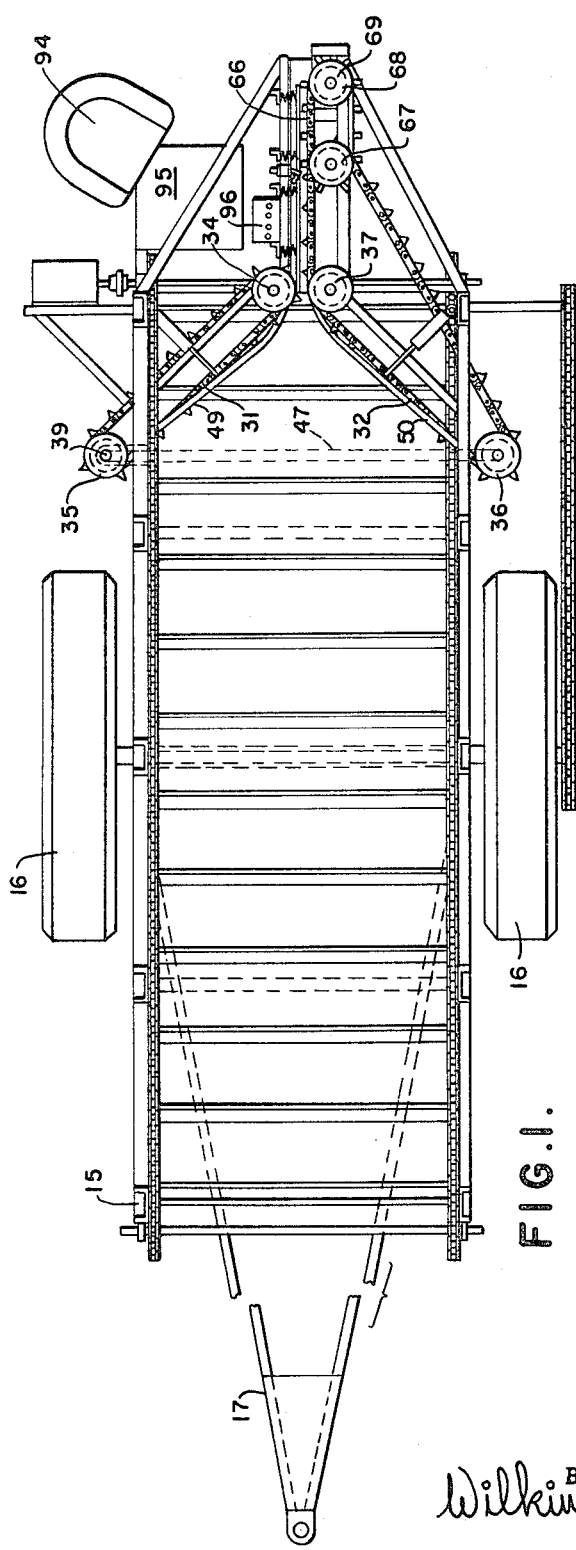
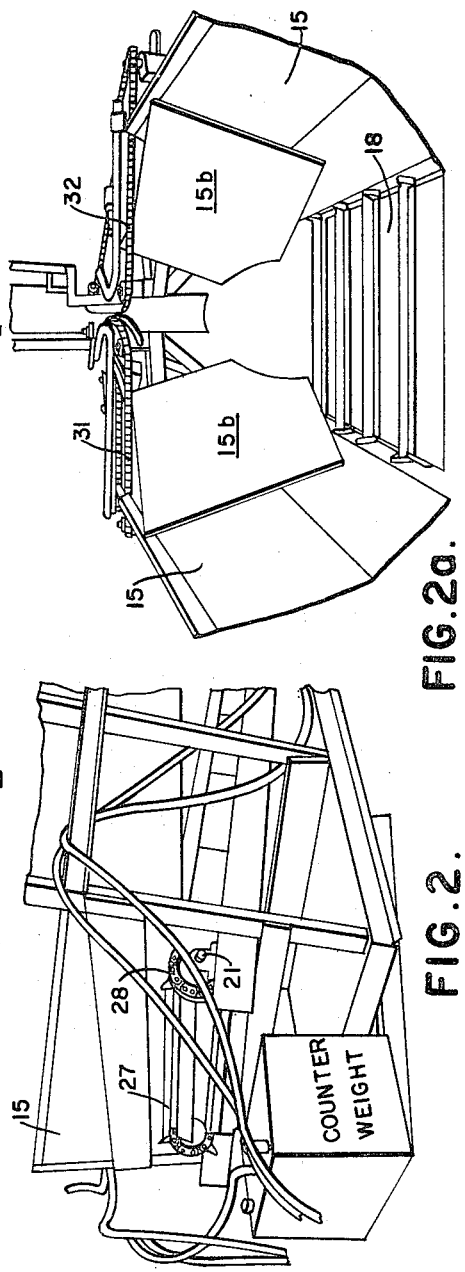
INVENTORS
D. A. Thibodeaux
M. P. I Richard &
W. J. Monson
BY Wilkinson, Mawhinney & Theibault
ATTORNEYS June 11, 1968  D. A. THIBODEAUX ET AL  3,387,745

SUGAR CANE PLANTING MACHINE

Filed Dec. 27, 1966  6 Sheets-Sheet 2

INVENTORS
D. A. Thibodeaux
M. P. Richard &
W. J. Monson

BY Wilkinson, Mawhinney & Theibault
ATTORNEYS

June 11, 1968  D. A. THIBODEAUX ET AL  3,387,745
SUGAR CANE PLANTING MACHINE
Filed Dec. 27, 1966  6 Sheets-Sheet 3
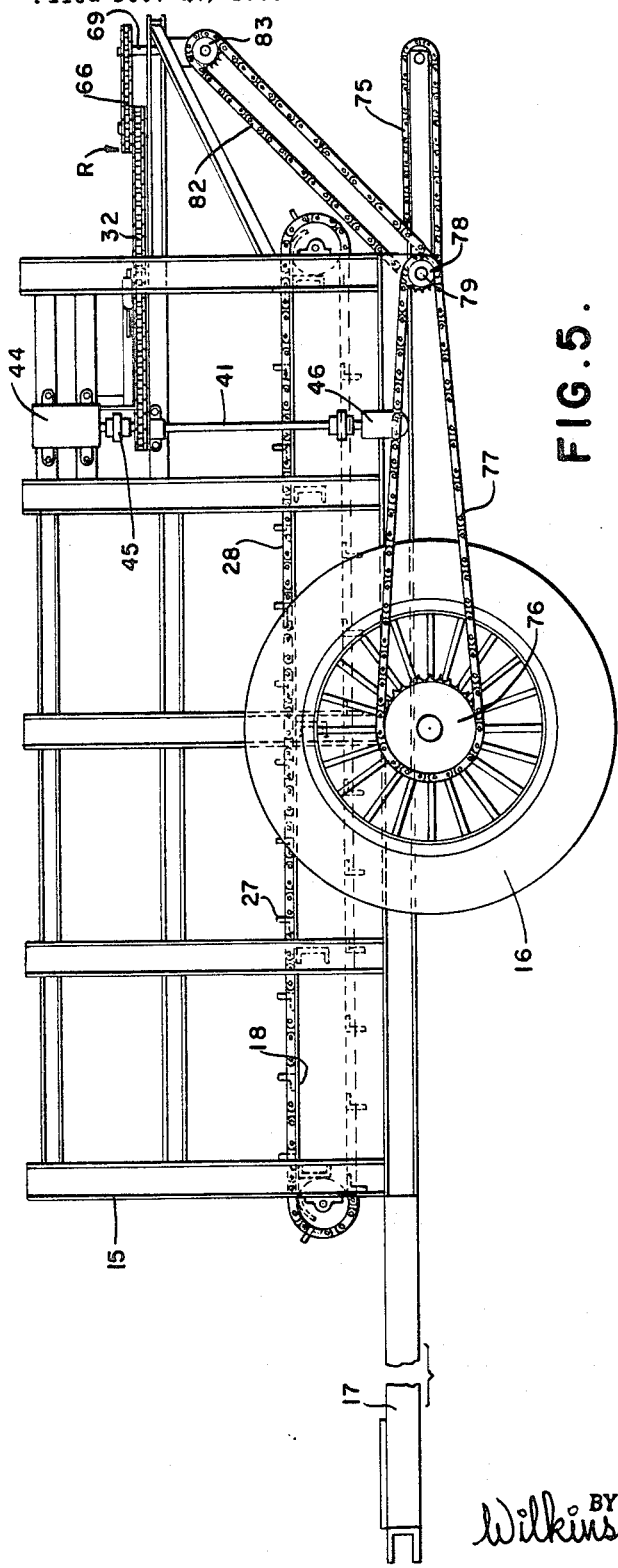
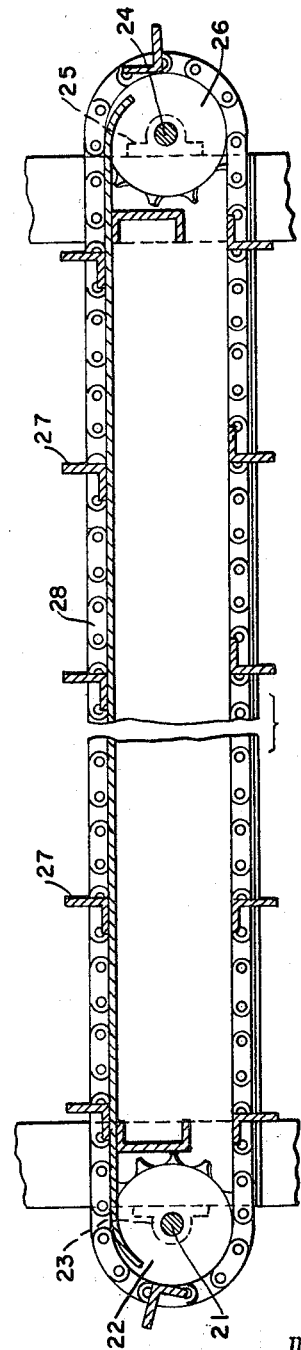
INVENTORS
D. A. Thibodeaux
M. P. Richard &
W. J. Monson
BY Wilkinson, Mawhinney & Theibautt
ATTORNEYS June 11, 1968　　D. A. THIBODEAUX ET AL　　3,387,745

SUGAR CANE PLANTING MACHINE

Filed Dec. 27, 1966　　6 Sheets-Sheet 4

INVENTORS
D. A. Thibodeaux
M. P. Richard &
W. J. Monson

BY Wilkinson, MawhInney & Thibaut

ATTORNEYS

INVENTORS
D.A. Thibodeaux
M. P. Richard &
W. J. Monson

BY Wilkinson, Mawhinney & Thibault
ATTORNEYS

June 11, 1968  D. A. THIBODEAUX ET AL  3,387,745
SUGAR CANE PLANTING MACHINE

Filed Dec. 27, 1966  6 Sheets-Sheet 6

INVENTORS
D. A. Thibodeaux
M. P. Richard &
W. J. Monson

BY Wilkinson, Mawhinney & Theibault
ATTORNEYS

United States Patent Office 3,387,745
Patented June 11, 1968

3,387,745
SUGAR CANE PLANTING MACHINE
Denis A. Thibodeaux, Rte. 2, Box 31, Murphy P. Richard, Rte. 2, Box 19, and Wesley J. Monson, Rte. 2, Box 10, all of Napoleonville, La. 70390
Filed Dec. 27, 1966, Ser. No. 604,893
12 Claims. (Cl. 221—185)

ABSTRACT OF THE DISCLOSURE

The invention involves a vehicle on to which sugar cane stalks are loaded, the vehicle being constructed to support the canes in at least a partially upright position and having mass cane advancing means to a restricted throat where the cane is fed by a cane feeding means to a reserve locus in the throat where canes may be held in reserve for the timed action of a metering mechanism by which the canes are delivered to the furrow or for the purpose of controlled planting of said cane in a metered pattern to result in a thick healthy crop.

---

The present invention relates to sugar cane planting machine, and has for an object a machine for the controlled planting of seed cane in a metered pattern best calculated to result in a thick healthy crop.

Another object of the invention is the semi-automatic operation of such machine in which normally automatic functions are arranged to be varied from a console or hydraulic valve bank by an experienced operator according to dictates, prompted by continuous observation of the the progress of the planting.

Other objects are to simplify planting operations and mechanism, reduce costs thereof and in general to achieve improved results in thhe planting of seed cane.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a top plan view of one form of a sugar cane planting machine constructed in accordance with the present invention.

FIGURE 2 is a front perspective view of the same.

FIGURE 5 is a side elevational view illustrating the relation between the cane wagon, feed mechanism, delivery device and associated parts.

FIGURE 6 is a longitudinal sectional view through the vehicle bed illustrating a form of vehicle cane support and mass cane advancing mechanism.

Support and mass cane advancing means

Figure 3:
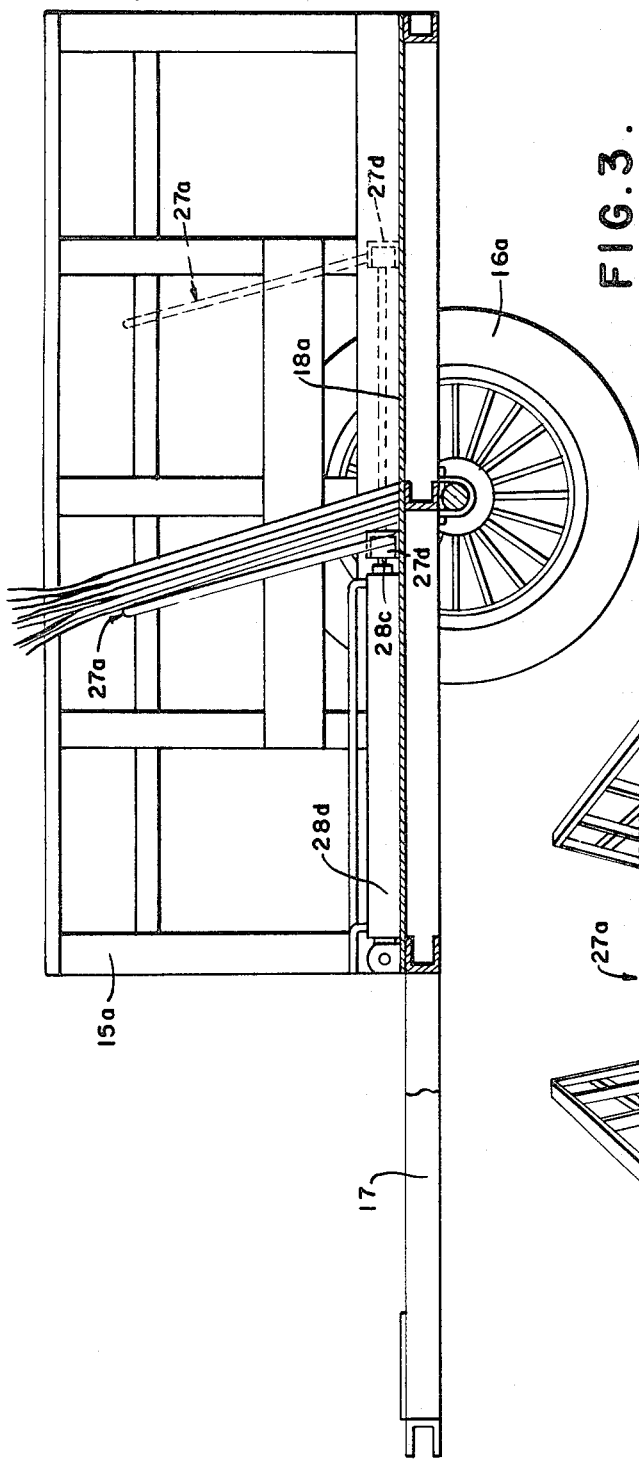
FIGURE 3 is a side elevational view of a modified form of the planting machine.

Referring more particularly to the drawings and for the moment to FIGURES 1, 3 and 5, 15 designates a vehicle which may be the usual cane wagon, 16 the ground wheels for supporting the vehicle, and 17 a draw bar at the forward end of the vehicle for attachment to a tractor by which the vehicle is drawn through the cane field or square.

The floor of the vehicle is indicated at 18. As shown in FIGURE 6 this floor may be supported by channel or other beams 19 and 20 attached to and forming parts of the vehicle framework.

An idler shaft 21 is mounted in bearings 23 at the forward portion of the vehicle having idler sprockets 22, as shown in FIGURES 5 and 6; and a rear drive shaft 24 is mounted in bearings 25 at the rear portion of the machine having drive sprockets 26 thereon in alinement with the forward sprockets 22.

In the form of the device shown in FIGURES 5 and 6, conveyor cleats 27 are connected transversely of the vehicle between endless chains 28 which are mounted to the sprockets 22 and 26, such cleats being spaced apart longitudinally of the vehicle and, as shown in FIGURE 6, the upper run of the conveyor so formed moves from front to rear above the floor 18 so as to advance the canes which are contained in a substantially erect position in the vehicle toward the rear thereof for planting.

Figure 4:
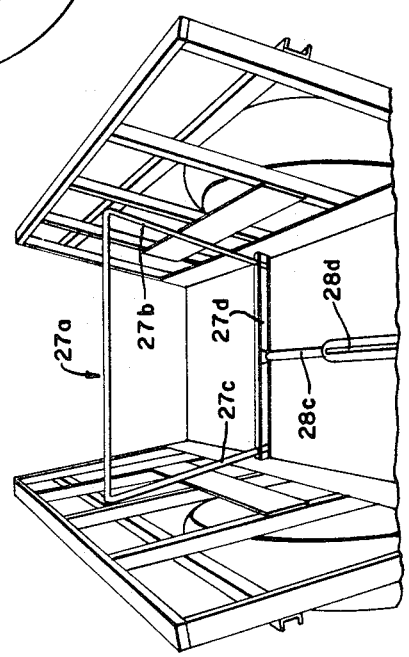
FIGURE 4 is a top perspective view taken on a magnified scale showing the form of invention of FIGURE 3.

In the form of device shown in FIGURES 3 and 4 the bed $18^a$ of cane wagon $15^a$ on wheels $16^a$ has a pipe-like frame $27^a$ the side members $27^b$ and $27^c$ of which conform to the upwardly divergent side walls of the cane wagon $15^a$. The base of the cane mass moving means $27^d$ has a ram $28^c$ driven by a cylinder $28^d$ which receives its motive fluid from the hydraulic plant of the tractor which tows the cane care. The cane stalks C are placed in the cart so as to ride on their butt ends so that the ram $28^c$ will push the pike-like frame $27^a$ rearwardly to supply cane stalks at the rear of the cart for planting.

Cane feeding mechanism

At the rear portion of the vehicle is a cane feeding mechanism comprising essentially a pair of endless sticker chains 31 and 32 which converge rearwardly to a throat 33. These sticker chains operate in a substantially horizontal plane. The chain 31 runs around sprockets 34, $34^a$ and 35, of which 35 may be the drive sprocket and 34, $34^a$ the idler sprockets.

The companion chain 32 is trained about a drive sprocket 36 and idler sprockets 37 and 38 (FIGURES 7 and 8) and involves a throat extension sticker chain $32^a$ movable rearwardly from the forward end of the throat between sprockets 37 and 38. The companion sticker feeding chain 31 terminates at the sprocket 34 at the forward mouth of the throat 33. The other feeder chain 32 has a return $32^b$ shown extending between the sprocket 38 and the sprocket $36^a$. The sprockets 35 and 34 are mounted upon substantially vertical shafts 40 and 39, while the sprockets 36, 37 and 38 are mounted respectively about substantially vertical shafts 41, 42 and 43.

Figure 7:
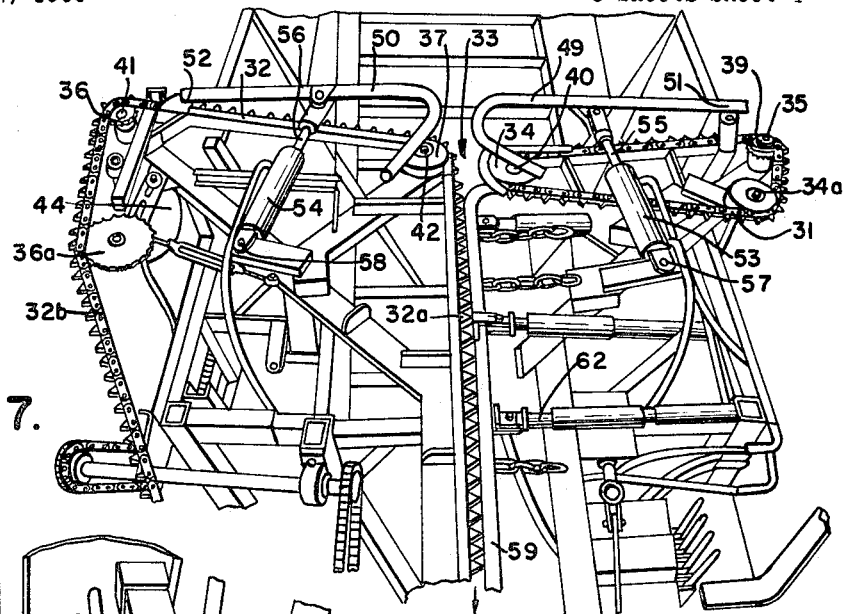
FIGURE 7 is a fragmentary top perspective view of a cane planting wagon constructed in accordance with the present invention having the metering device thereon.
Figure 8:
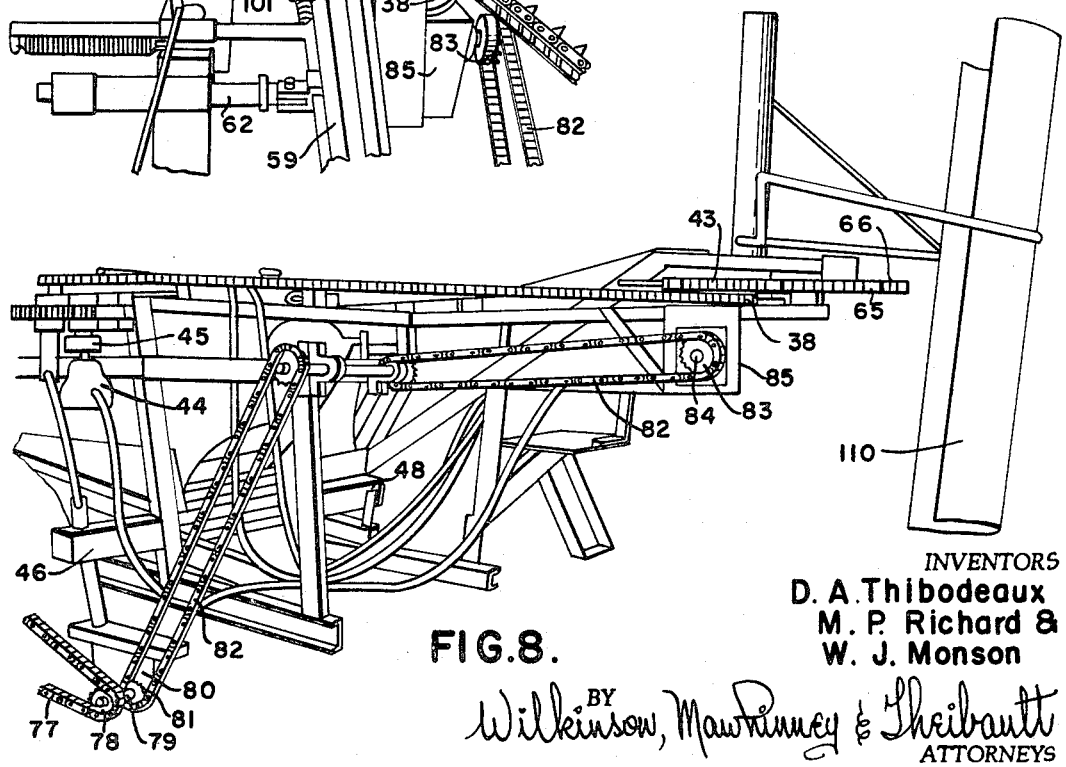
FIGURE 8 is a fragmentary rear perspective view of the metering and planting device of the present invention.

The chains 31 and 32 move in the direction of the arrows, indicated in FIGURE 1, and are driven by any suitable means; for instance, from the hydraulic motor 44 shown in FIGURES 7 and 8. The motor 44 is connected by a coupling 45 to the shaft 41 of the drive sprocket 36, extends down to a bevel gear housing 46 and then connects with a substantially horizontal shaft 47 to the other side of the machine where the shaft 57 connects with bevel gears in another angle housing 48 which connects with the lower end of the shaft 39 of drive sprocket 35. These various shafts are carried by appropriate bearings in the framework of the vehicle.

The standing canes in the vehicle have access to the forward runs of the feeding chains 31 and 32 under control of control rails or bars 49 and 50. At their forward ends these control members or bars, sometimes called "brush pipes," are pivoted at 51 and 52 to appropriate frame members of the vehicle so as to ordinarily occupy the full line positions of FIGURE 7, thereby preventing the canes in the wagon from access to the sticker chains 31 and 32.

However, under suitable control means these bars may be moved to the rear in which event the canes in the wagon at the rear portion thereof may be engaged and impaled by the stickers of the chains 31 and 32 and thereby moved toward the throat 33 where the free ends of the control bars 49 and 50 are curved in relatively opposite directions to form the mouth of the throat 33 and to permit feeding of the cane into such throat.

Any suitable means may be employed to move the control bars 49 and 50 to the respective forward or rear positions and hydraulic rams are shown for this purpose, including the cylinders 53, 54 and the plunger rods 55, 56. The rams are shown as pivoted at one end 57, 58 to the vehicle frame-work and are connected as to the forward ends of their plunger rods 55, 56 to the respective control bars 49, 50.

The throat extension sticker chain 42a cooperates with a pressure member 59, as shown in FIGURE 7, having a forward inclined end for guiding the cane fed to the throat into the stickers of chain throat extension 32a. A form of such pressure member 59 may be as shown in FIGURE 7 so that the rods extend in a substantially horizontal direction substantially parallel with the throat extension sticker chain 32ᵃ. The member 59 is carried by one or more rods 62 slidably mounted through parts of the vehicle frame 15, so as to yieldably project pressure bar 59 against the canes to maintain same in impaled contact with the stickers of the chain throat extension 32ᵃ.

Figure 9:
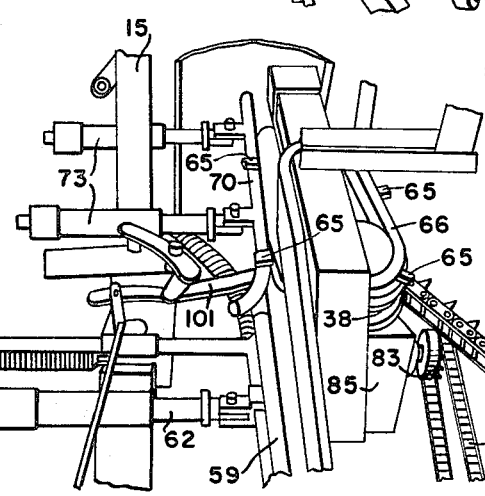
FIGURE 9 is a perspective view of the planting device of the present invention.
Figure 10:
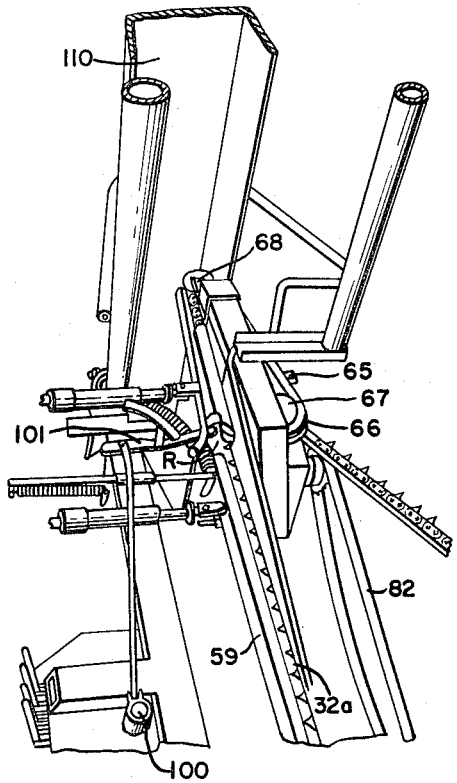
FIGURE 10 is a perspective view similar to FIGURE 9.

As shown in FIGURES 9 and 10 upon the cane stalks arriving at locus R the canes are at least momentarily allowed to come to rest until pick up by projections 65 on the delivery metering chain 66.

Metering delivery mechanism

The metering chain 66 passes about a sprocket 67 mounted to the shaft 43 and lying above sprocket 38 (FIGURE 9). The other end of the endless metering chain 66 is engaged about a sprocket 68 on a vertical shaft 69 parallel with the shaft 43.

The projections 65 of the metering chain are long enough to contact the canes in locus R and move the same on to the rear delivery end of the throat.

A pressure member 70 is disposed in the throat opposite the metering chain 66 for maintaining the canes in the spaces between the projections as to be carried along to the rear delivery end.

This pressure member is shown more particularly in FIGURES 9 and 10 to be a bar form disposed in position to contact the stalks or canes under yieldable pressure of coil springs shock absorbers 73 between the member 70 and adjacent parts of the framework 15. The pressure bar 70 will thus yieldably urge the stalks toward the backwardly moving adjacent run of the metering chain 66. The front ends of these pressure bars 70 are curved in the manner indicated in FIGURE 9 to guide the canes from the reserve locus to spaces between the metering projections 65.

A conveyor 75 (FIGURE 5) is disposed vertically below the throat 33 from the reserve locus R to the delivery end of the metering chain 66 in order to support the stalks and prevent the same from falling to the ground when disengaged from the sticker chain 32ᵃ at locus R. This conveyor extends out to the rear end of the machine so as to tip the base of the canes forwardly to permit dropping of the canes into the furrows when moving off the rear end of the metering chain 66.

Metering chain operation

According to one form of the invention, as shown in FIGURE 5 and 8, the metering chain 66 may be driven continuously from motion derived from movement of the vehicle through the square, for which purpose one of the ground wheels 16 or its axle may have affixed thereto a sprocket 76 for driving a chain 77 which extends rearwardly to a sprocket 78 on a transverse shaft 79 supported by appropriate bearings 80 from the vehicle 15, as shown in FIGURE 8.

At an intermediate point the shaft 79 has affixed thereto a sprocket 81 engaged by a metering drive chain 82 which extends diagonally upwardly and rearwardly to a sprocket 83 on a shaft 84 which drives bevel gears in a housing 85, which in turn drives the rear shaft 69, sprocket 68 and the metering chain 66.

Pursuant to this drive the metering chain will be driven at a speed proportional to the linear movement of the vehicle down the furrow and will, therefore, deposit the canes successively at metered distances apart in the furrow. Such metered distances will depend upon the proportion of size of the sprockets of the drive and/or the distance apart of the metering projections 65 and the chain 66.

Modified form of metering drive

In operation an operator occupies a seat 94 having a platform or foot rest 95 and a control console or valve bank 96 which will receive hydraulic fluid under pressure from the usual source on the tractor.

Figure 12:
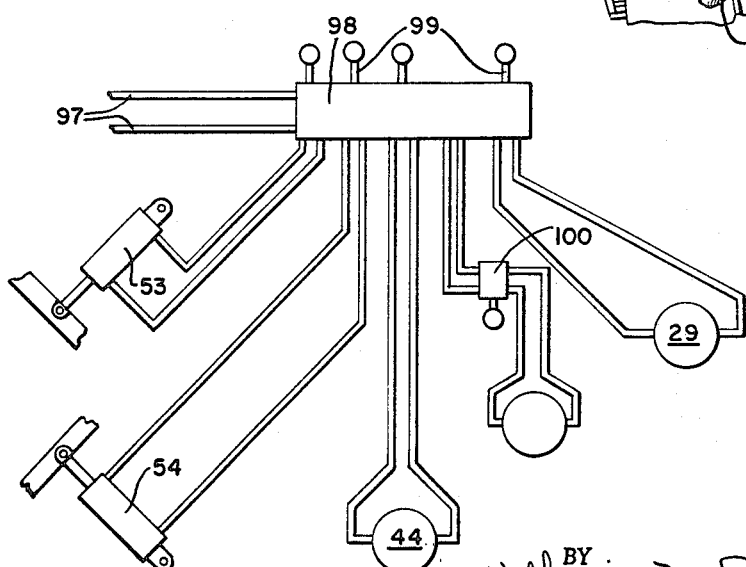
FIGURE 12 is a hydraulic schematic of a device constructed in accordance with the present invention.

FIGURE 12 shows a proposed console or valve bank system with the supply and return pipes 97 extending to the tractor hydraulic fluid supply and connecting with a tributor head 98 having valves controlled by operating handles or levers 99 which are adapted to selectively direct hydraulic fluid into the motor 29, the motor 44 or the hydraulic rams 53 and 54.

Or, to the valve 100 located at or about the reserve locus R, as shown in FIGURES 4 and 8. This valve has a movable plunger 101 projecting into the path of canes occupying the reserve locus R so that the canes may automatically trip the valve 100 and thus cause actuation of the timer chain 66 through the operation of the hydraulically operated variable drive 86.

As shown in FIGURES 8 and 9 the sprockets 38 and 43 are mounted on a common shaft, sprocket 38 rotating freely about the shaft and sprocket 43 being keyed to be driven by the shaft to drive metering chain 66.

The embodiment of cane planter shown in FIGURES 1 and 5 may be modified as in FIGURE 2 to raise the leading end of the endless chains 28 and floor 18 for advancing the cane rearwardly to the automatic planting device.

As shown in FIGURE 2A rearwardly convergent baffle plates 15ᵇ are positioned to guide the cane into the throat of the metering device at the rear of the can cart.

Figure 11:
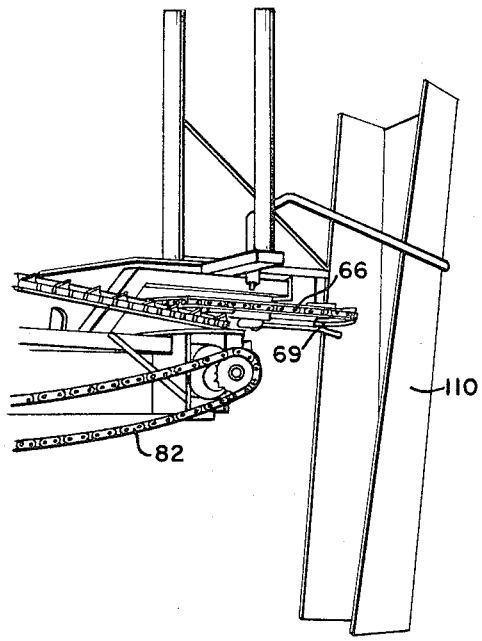
FIGURE 11 is a fragmentary rear perspective view of the planter of FIGURES 9 and 10.

As best seen in FIGURES 10 and 11, located to the rear of the metering chain 66 is a planting deflecting shield 110 which causes the cane stalks discharged from metering chain 66 to be tilted and fall in the desired position into the planting furrow.

Modified planting system

Figure 13:
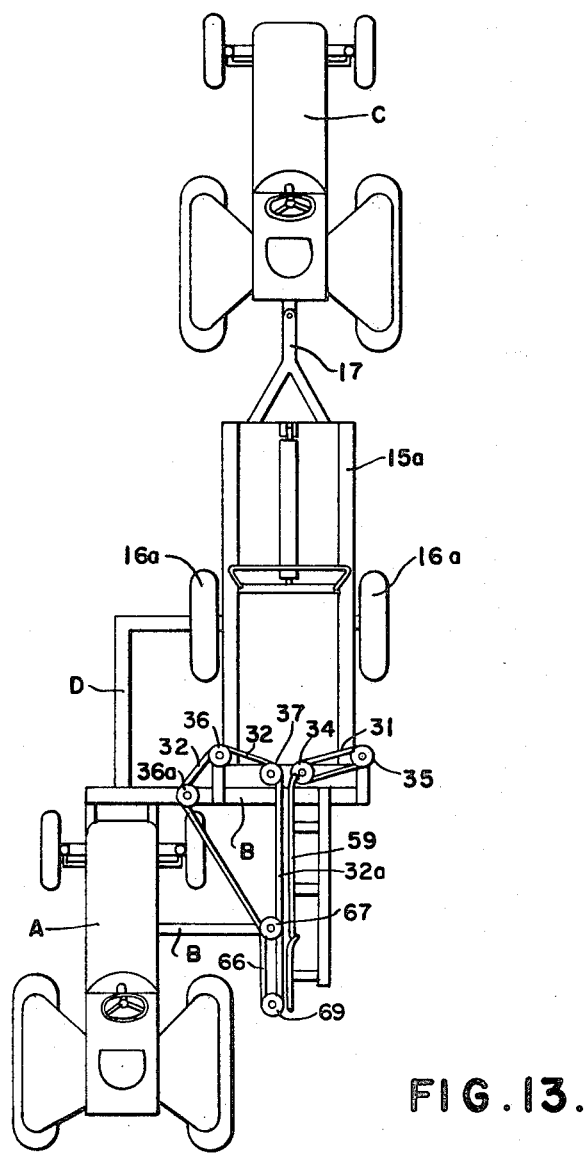
FIGURE 13 is a schematic top plan view of a modified form of the present invention.

A further modification of the invention is shown in FIGURE 13 wherein the metering and planting device is mounted separately on a tractor A by bracket supports B so that the metering and planting device is separate from the cane wagon 15ᵃ which has the cane mass moving means only thereon as shown in FIGURE 3. The cane wagon 15ᵃ is connected through draft tongue 17 to a lead tractor C. The tractor C assumes the full pulling load for the embodiment shown in FIGURE 13. The rear tractor A having the metering and planting device mounted thereon is mechanically coupled to the cane wagon 15ᵃ by a draft bar D. The rear tractor A supplies only hydraulic power to operate the metering and planting device, tractive power for the whole rig coming from tractor C. The benefit derived from this arrangement is that several cane wagons may be modified as shown in FIGURE 3 so that they may be uncoupled when empty and sent to the harvester cutting the plant cane while not stopping the planting due to the metering and planting device being sent to the harvester which is usually a good distance from the planting operation. Modifying 3 or 4 wagons as shown in FIGURE 3 with only cane mass moving means is much less expensive than building two units as shown in FIGURES 1 and 8.

*Operation*

The cane is loaded into the wagon or vehicle 15 with conventional can loader and it is placed in a semi-vertical attitude starting from the rear of the wagon where the cane stalks will lean against the pressure rails 49 and 50 at which the canes are brought into a nearly vertical position by the action of the floor conveyor including the conveyor cleats or slats 27.

The control bars 49 and 50 will normally contact the cane stalks and prevent the same from being moved along toward the throat. Under the control of the operator the rams 53 and 54 may be put into operation to draw the control rails 49 and 50 backwardly to a desired angular position where some or all of the stickers of one or both of the chains 31 and 32 may be exposed and in this way the quantity of canes fed to the throat 33 may be governed by the operator. Thus the operator may control the amount of canes brought into the throat. It will be understood from the diagram, FIGURE 11, that the operator may control the position of the rails 49 and 50 separately.

The canes are moved through the throat by the throat sticker chain extension 32ᵃ up to the reserve locus R where the canes are disengaged by the disc 64 and held in reserve until removed by the fingers or projections 65 of the metering delivery chain 66.

The cane is fed into chains 31 and 32 driven by hydraulic motor 44 which is controlled by hydraulic valve 100 which is located in a position where chain 66 which is driven from wheel 16, fingers 65 on chain 66 and removes cane at spaced intervals. As the cane is removed by fingers 65, upon the cane engaging and actuating pivoted trip lever 102, rod 103 being connected thereto at one end and having an inverted cup shaped member receivable over hydraulic valve knob of valve 100 will cause the valve 100 to open and drive motor 44 to activate chains 31 and 32 which will bring cane in position to be removed by finger 65. Amount of cane fed into chains 31 and 32 is controlled by operator with hydraulic rams 53 and 54 connected to the control rails 49 and 50. The amount of stalks to be dropped in any given distance is determined by the number of fingers 65 on the metering chain 66.

The cleats 27 of FIGURES 5 and 6 and the frame 27ᵃ, 27ᵇ, 27ᶜ and 27ᵈ of FIGURES 3 and 4 constitute in effect followers which engage forward stalks of the cane mass and function to move the stalks, as a mass, rearwardly toward the throat and planting device.

In FIGURES 3 and 4 the follower may be driven by a suitable ram 28ᶜ, the ram being driven by hydraulic or other fluid pressure and thus the fluid pressure will maintain the follower against the stalk mass, constantly urging the mass rearwardly of the cart, but at the same time such fluid pressure motor 28ᵈ is particularly suited to this purpose because, while it maintains a constant pressure of the follower against the stalk mass, such motor will not drive the ram with too great a pressure such as to injure or break the stalks and make them unsuitable for conforming to subsequent treatment as by the feeding conveyor in the throat and by the subsequent action of the metering device in delivering the canes from the reserve space to the planter.

Although we have disclosed herein the best forms of the invention known to us at this time, we reserve the right to all such modifications and changes as may come within the scope of the following claims.

What is claimed is:
1. A sugar cane planting machine comprising:
 (a) a vehicle movable along a furrow to be planted,
 (b) a reserve locus for seed canes on the vehicle,
 (c) means for feeding canes to the reserve locus,
 (d) cane delivery means passing through the locus for delivering the canes in metered sequence to the furrow, said feeding means comprising:
 (e) at least one sticker chain, and
 (f) a control rail movable relatively to the sticker chain for controlling access of the canes to the sticker chain so that feeding of the canes to the reserve locus may be continued or interrupted under regulation to avoid choking of the reserve locus while insuring a continuing adequate supply of the canes thereto.

2. A sugar cane planting machine as claimed in claim 1, further comprising:
 (g) hydraulic ram means on the vehicle connected to the movable control rail, and
 (h) regulating means for the ram.

3. A sugar cane planting machine comprising:
 (a) a vehicle movable along a furrow to be planted,
 (b) a reserve locus for seed canes on the vehicle,
 (c) means for feeding canes to the reserve locus,
 (d) cane delivery means passing through the locus for delivering the canes in metered sequence to the furrow,
said feeding means comprising:
 (e) at least two endless sticker chains mounted for movement on the vehicle and convergently arranged in a direction rearward of the vehicle,
 (f) a throat on the vehicle having a receiving end disposed to receive canes from the convergent end portions of the feed sticker chains, and a rear discharge end,
 (g) said reserve locus located intermediate the ends of the throat, communicating with the throat and offset to one side of the throat,
 (h) at least one of the feed sticker chains having an extension extending into the throat substantially to the reserve locus,
 (i) pressure means in the throat opposite the feed sticker chain extension acting to urge the canes against the extension sticker chain,
 (j) a rotating member in the throat substantially in the area of the reserve locus for freeing the canes from the feed sticker chain extension and directing the canes into the reserve locus,
 (k) support means for the canes on the vehicle beneath the reserve locus and continuing substantially to the discharge end of the throat,
 (l) means in the vehicle for mass advancing canes in the vehicle to the convergent ends of the sticker chains,
 (m) means for controlling the accessibility of the canes to the sticker chains, and
 (n) manual control means for controlling the operation of the sticker chains, their accessibility controlling means, the cane mass advancing means, and cane delivery means including the timing thereof.

4. A sugar cane planting machine comprising:
 (a) a vehicle movable along a furrow to be planted,
 (b) a reserve locus for seed canes on the vehicle,
 (c) means for feeding canes to the reserve locus,
 (d) cane delivery means passing through the locus for delivering the canes in metered sequence to the furrow,
 (e) hydraulically operated variable drive means for the cane delivery means,
 (f) a hydraulic valve for controlling the actuation of the variable drive means, and (g) an actuating member for the valve extending into the reserve locus for actuation by a cane therein to trigger the valve into position for energizing the variable drive to in turn put into motion the cane delivery means.

5. A sugar cane planting machine comprising:
(a) a vehicle movable along a furrow to be planted adapted to contain canes supported on end,
(b) planting means positioned to receive the canes,
(c) continuously moving feeding means on the vehicle for feeding the canes to the planting means, and
(d) control means associated with the feeding means for governing access of the canes to the feeding means to regulate the supply of canes to the planting means.

6. A sugar cane planting machine as claimed in claim 5 in which the feeding means is a sticker chain, and the control means is an adjustable rail and further comprising:
(e) a ram connected to adjust the rail relatively to the sticker chain.

7. In the art of planting sugar cane stalks, in which the stalks have larger lower butt ends, extend some six or more feet from the butt ends in a cross-sectionally generally round configuration and in a narrowing progression to thin tassel upper ends with substantial flexibility to stalk from which specifications the stalks are unable to stand erect on their butt ends, the combination of
(a) a cane wagon adapted for movement through a cane field prepared for planting,
(b) a bottom wall in the wagon for receiving the butt ends of the stalks in an erect mass formation,
(c) side walls high relatively to the height of the stalks for confining the stalks laterally in said mass formation,
(d) actuating means in the wagon for moving the stalks en masse toward an end of the wagon, and
(e) planting means in communication with said end of the wagon for receiving the stalks from the actuating means.

8. The combination of claim 7 in which said actuating means comprises:
(g) pusher means abutting the cane stalk mass and pushing the mass toward the planting means.

9. The combination of claim 8 in which the pusher means comprises:
(h) an endless conveyor having an upper run travelling over the bottom wall of the wagon, in a direction toward the planting means, and
(i) follower means on the conveyor for engaging the stalk mass and moving said mass toward the planting means.

10. The combination of claim 8 in which said pusher means comprises:
(j) follower means having parts engaging the adjacent cane stalks at upper and lower portions thereof, and
(k) a fluid pressure-actuated ram mounted in the vehicle and connected to said follower means for moving the follower means against the stalk mass.

11. A sugar cane planting machine comprising:
(a) a vehicle movable along a furrow to be planted,
(b) a throat on the vehicle having a receiving end and a discharge end,
(c) a reserve locus located between the ends of the throat, communicating with the throat and offset to one side of the throat,
(d) cane feeding means extending into the throat substantially to the reserve locus,
(e) means in the throat substantially in the area of the reserve locus for freeing the canes from the feeding means and directing the canes into the reserve locus,
(f) support means for the canes on the vehicle beneath the reserve locus and continuing substantially to the discharge end of the throat,
(g) normally inactive cane delivery means adapted to pass through the reserve locus for delivering the canes in metered sequence to the furrow, and
(h) actuating means for the cane delivery means having a part extending into the reserve locus for actuation by a cane therein to trigger the cane delivery means into action.

12. A sugar cane planting machine as claimed in claim 11 in which said actuating means for the cane delivery means comprises:
(i) hydraulically operated variable drive means for the cane delivery means,
(j) a hydraulic valve for controlling the actuation of the variable drive means, and
(k) an actuating member for the valve extending into the reserve locus for actuation by a cane therein to trigger the valve into position for energizing the variable drive to in turn put into motion the cane delivery means.

References Cited

UNITED STATES PATENTS

| | | | |
|---|---|---|---|
| 1,990,549 | 2/1935 | Kimball | 198—30 |
| 3,073,265 | 1/1963 | Movilla et al. | 221—185 X |
| 3,338,439 | 8/1967 | Barrilleaux et al. | 221—185 X |

STANLEY H. TOLLBERG, *Primary Examiner.*